US009638323B2

(12) United States Patent
Braun et al.

(10) Patent No.: US 9,638,323 B2
(45) Date of Patent: May 2, 2017

(54) CYLINDER HOUSING OF LIGHTWEIGHT/HYBRID CONSTRUCTION AND METHOD FOR THE PRODUCTION THEREOF

(71) Applicant: MARK Hydraulik GmbH, Spital am Pyhrn (AT)

(72) Inventors: Gottfried Braun, Ebergassing (AT); Rudolf Mark, Windischgarsten (AT); Martin Fiedler, Vienna (AT)

(73) Assignee: MARK Hydraulik GmbH, Spital am Pyhrn (AT)

( * ) Notice: Subject to any disclaimer, the term of this patent is extended or adjusted under 35 U.S.C. 154(b) by 50 days.

(21) Appl. No.: 14/780,088

(22) PCT Filed: Mar. 27, 2014

(86) PCT No.: PCT/AT2014/050077
§ 371 (c)(1),
(2) Date: Oct. 20, 2015

(87) PCT Pub. No.: WO2014/153587
PCT Pub. Date: Oct. 2, 2014

(65) Prior Publication Data
US 2016/0047472 A1 Feb. 18, 2016

(30) Foreign Application Priority Data
Mar. 28, 2013 (AT) ............... A 50214/2013

(51) Int. Cl.
*F16J 10/02* (2006.01)
*F15B 15/14* (2006.01)
(Continued)

(52) U.S. Cl.
CPC ............. *F16J 10/02* (2013.01); *B29C 53/585* (2013.01); *F15B 15/1428* (2013.01);
(Continued)

(58) Field of Classification Search
CPC ...... F16J 10/02; B29C 53/60; B29C 53/8008; B29C 53/822; B29C 53/585
(Continued)

(56) References Cited

U.S. PATENT DOCUMENTS 4,685,384 A * 8/1987 Dirkin ................ B29C 63/0021
92/166
4,704,918 A 11/1987 Orkin et al.
(Continued)

FOREIGN PATENT DOCUMENTS

DE  10 2004 008 523 B4   2/2007
EP       0 464 202 A1    1/1992
(Continued)

OTHER PUBLICATIONS

International Search Report of PCT/AT2014/050077, mailed Jul. 31, 2014.

*Primary Examiner* — Thomas E Lazo
(74) *Attorney, Agent, or Firm* — Collard & Roe, P.C.

(57) ABSTRACT

The invention relates to a cylinder housing (2) for a pressure cylinder (1) of light-weight/hybrid construction, having a support structure (4) comprising an inner tube (6) with ends (7, 8) that are spaced apart in the axial direction, and a first and a second end piece (10, 11) in the region of one of the ends (7, 8) of the inner tube (6). A composite structure (12) made of a fiber-reinforced plastics material is arranged on an outer surface (13) of the inner tube (6). Arranged on an outer surface (16) of the first and the second end piece (10, 11) in each case in a manner distributed over the circumference thereof are a plurality of rod-like winding aids (17) that protrude from the outer surface (16). The winding aids (17) have sufficient strength to allow a winding operation during the application of the threads of the composite structure (12), individual threads of the composite structure (12) being guided during said winding operation around at least one of
(Continued)

Figure 1:
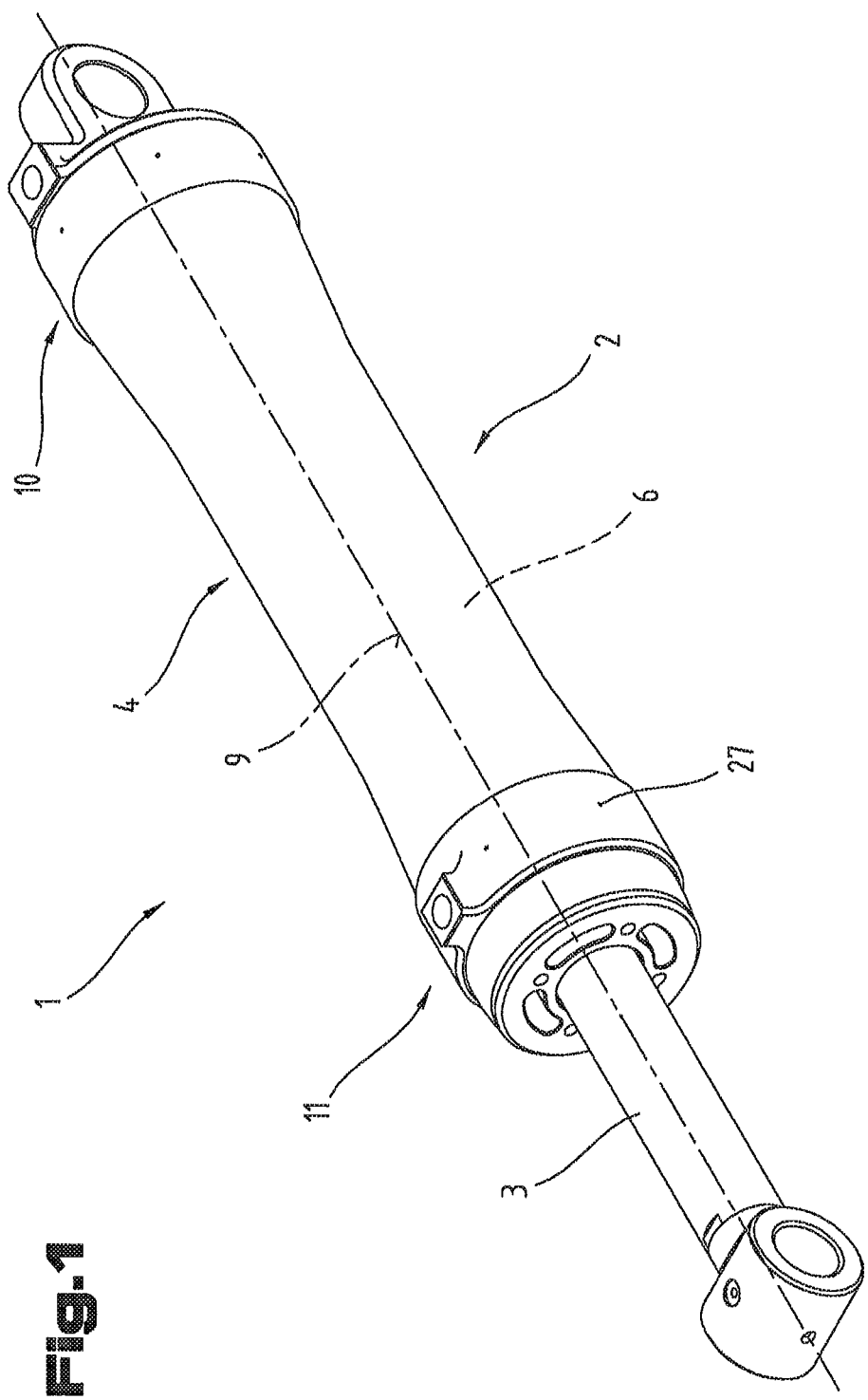

the winding aids (17) in a deflection region (18) on sides that face away from one another in each case in the axial direction. Following the formation of the composite structure (12), the winding aids (17) are reshaped and at least regionally embedded in the composite structure (12). The invention also relates to a pressure cylinder (1) having such a cylinder housing (2) and to a method for the production thereof.

19 Claims, 4 Drawing Sheets

(51) Int. Cl.
    *B29C 53/58*     (2006.01)
    *B29D 23/00*     (2006.01)
    *B29C 53/60*     (2006.01)
    *B29C 53/80*     (2006.01)
    *B29C 53/82*     (2006.01)

(52) U.S. Cl.
    CPC .......... *B29C 53/60* (2013.01); *B29C 53/8008* (2013.01); *B29C 53/822* (2013.01); *B29D 23/001* (2013.01); *F15B 2215/305* (2013.01)

(58) Field of Classification Search
    USPC .......................................................... 92/169.1
    See application file for complete search history.

(56) References Cited

U.S. PATENT DOCUMENTS

| | | | | |
|---|---|---|---|---|
| 5,318,374 A | * | 6/1994 | Rumberger | ............. F16B 4/006 |
| | | | | 403/277 |
| 5,685,933 A | * | 11/1997 | Ohta | ..................... B29C 53/583 |
| | | | | 156/169 |
| 8,262,825 B2 | * | 9/2012 | Fahey | .................. B29C 53/585 |
| | | | | 156/172 |

FOREIGN PATENT DOCUMENTS

| | | |
|---|---|---|
| GB | 2 054 083 A | 2/1981 |
| JP | S 48-20032 B | 6/1973 |
| JP | S 61-3732 A | 1/1986 |
| JP | H 3-236946 A | 10/1991 |
| JP | H 3-281232 A | 12/1991 |
| WO | 91/11319 A1 | 8/1991 |

* cited by examiner

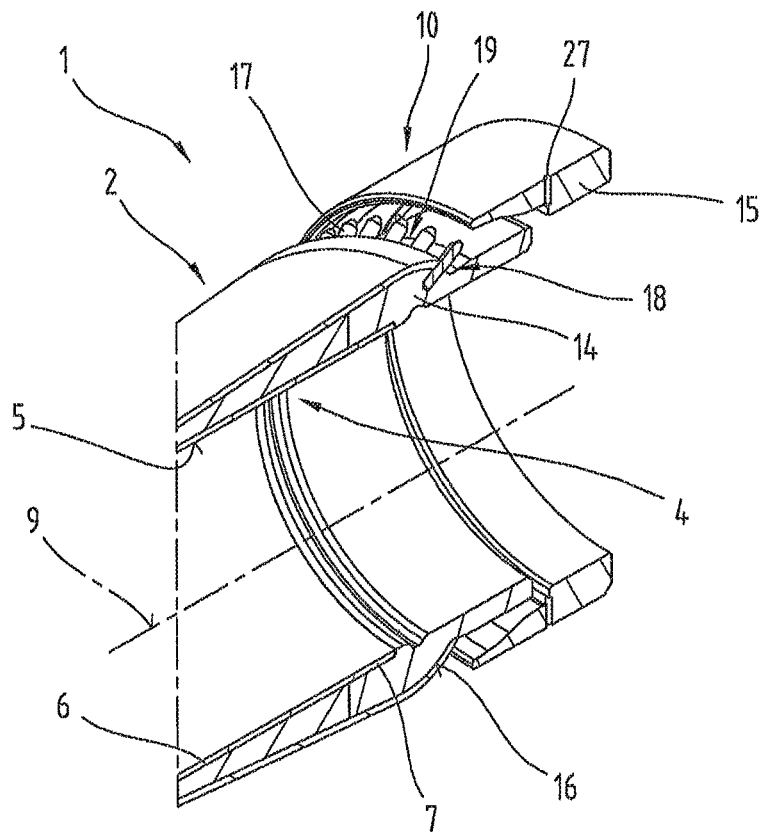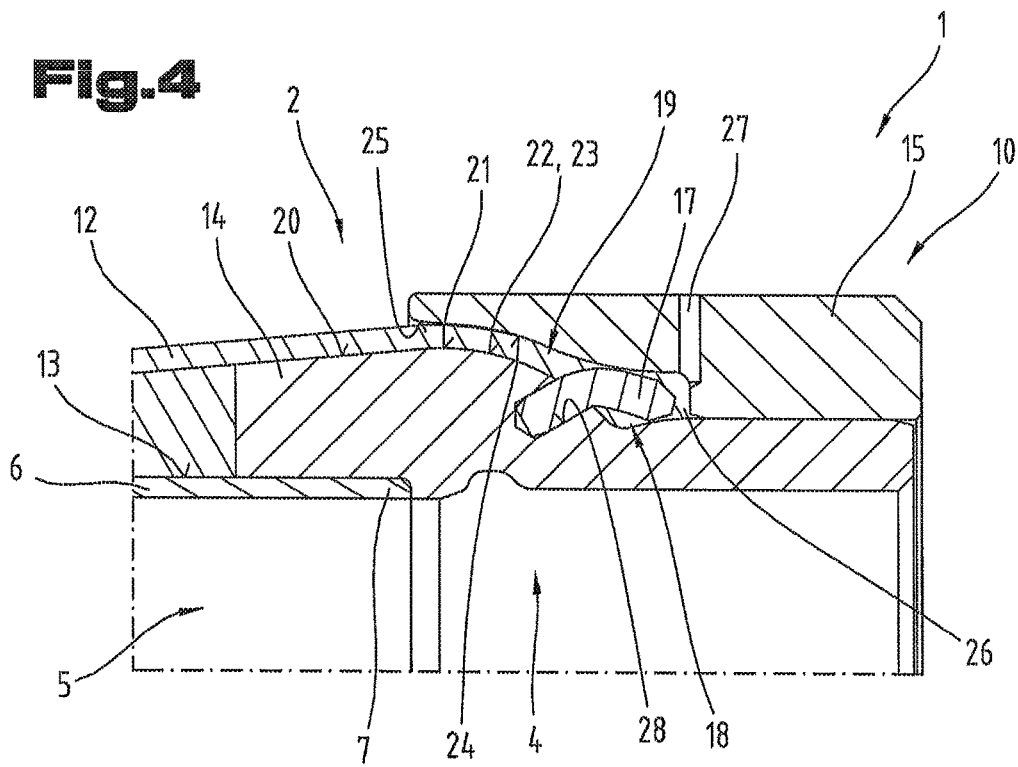

CYLINDER HOUSING OF LIGHTWEIGHT/HYBRID CONSTRUCTION AND METHOD FOR THE PRODUCTION THEREOF

CROSS REFERENCE TO RELATED APPLICATIONS

This application is the National Stage of PCT/AT2014/050077 filed on Mar. 27, 2014, which claims priority under 35 U.S.C. §119 of Austrian Application No. A 50214/2013 filed on Mar. 28, 2013, the disclosure of which is incorporated by reference. The international application under PCT article 21(2) was not published in English.

The invention relates to a cylinder housing of lightweight hybrid construction for a pressure cylinder, a pressure cylinder with such a cylinder housing and a method for producing a cylinder housing of lightweight hybrid construction for a pressure cylinder.

A cylinder housing for a pressure cylinder of lightweight hybrid construction of the generic type is known from EP 0 464 202 A1. It has a support structure comprising an inner tube with ends spaced apart from one another in the axial direction, and a longitudinal axis extending between the latter. A first and a second end piece is disposed respectively in the region of one of the ends of the inner tube. A composite structure made from a fiber-reinforced plastics material is disposed on an outer surface of the inner tube, which extends continuously in the axial direction between the first and second end piece and is joined thereto. Disposed on an outer surface of the first and second end pieces, distributed in each case around the circumference thereof, are several rod-shaped winding aids protruding from the outer surface. The winding aids are of a sufficient strength to allow a winding operation during the application of the threads of the composite structure, during which individual threads of the composite structure are guided around at least one of the winding aids in a deflection region on sides facing away from one another respectively in the axial direction.

Other cylinder housings for pressure cylinders of lightweight hybrid construction having winding aids disposed on their ends spaced apart from one another in the axial direction are known from JP 03-236 946 A, JP 03-281 232 A, JP 61-003732 A and JP 48-200032 A.

DE 10 2004 008 523 B4 discloses a method of producing a pressure cylinder and a piston rod for actuators or shock absorbers. The cylinder housing is provided in the form of a lightweight hybrid construction and has a support structure comprising an inner tube with ends spaced apart from one another in the axial direction and first and second end pieces disposed respectively in the region of one of the ends of the inner tube. A composite structure made from a fiber-reinforced plastics material is also provided, which is disposed on an outer surface of the inner tube. It extends continuously in the axial direction between the first and second end pieces and is joined to the latter. The piston rod has terminations on its end faces between which a metal inner draw tube and a thin-walled metal outer running pipe extend, and the metal outer running pipe is disposed concentrically with the metal inner draw tube. Also disposed between the draw tube and running pipe is a core made from fiber-reinforced plastics material, made up of tubular core halves or core parts in the radial direction. A first core part made from fiber-reinforced plastics material is mounted on the inner draw tube and another core part likewise made from fiber-reinforced plastics material is mounted on the internal face of the outer running pipe. The external dimensions of the inner core part are selected so that the outer core part can be pushed over it, after which the two core parts can be glued. The end regions of the inner draw tube and outer running pipe respectively facing the metal terminations are welded to these components to enable force to be transmitted. Force is therefore transmitted entirely via the two tubes welded to the metal terminations. The disadvantage of this is that forming the weld seam and the production process generally are complicated.

U.S. Pat. No. 4,704,918 discloses a push, pull and/or torsion rod of lightweight construction, wherein fittings are spaced at a distance apart from one another and a core component in the form of a lightweight component is provided in between bridging this distance. This unit is enclosed across its entire length by a fibrous layer reinforced with resin in the form of braided fibers. In addition, an extra covering made from another material may be applied to the outer surface. During this production process, the thread or fiber braid is impregnated with resin. This makes the entire process much more difficult because it is always necessary to work with a fiber material wetted or impregnated with a resin that has not yet solidified.

The underlying objective of this invention is to propose a cylinder housing of light-weight hybrid construction and a pressure cylinder fitted with such a cylinder housing, which can be produced easily and cost-effectively and whereby a strong force is obtained for retaining the composite structure on the two end pieces, to ensure that the support structure of the cylinder housing will reliably remain intact even at high operating pressures. A method for producing a cylinder housing of lightweight hybrid construction is also specified, whereby the threads of the composite structure can be easily and reliably applied, obviating the need for subsequent steps of processing steps the composite structure and cutting thereof.

This objective is achieved on the basis of the features according to one aspect of the invention. The advantage obtained as a result of the features according to the invention resides in the fact that it is possible, first of all, to prepare an inner tube of an appropriate design which meets the requirements demanded of a cylinder chamber in terms of surface quality. End pieces are provided on its ends, which are used to guide the piston rod or to fit the pressure cylinder formed thereby. To provide a mutual connection of the end pieces, the composite structure made from a plastics material reinforced with threads is provided on the external face of the inner tube, extending continuously in the axial direction between the two end pieces and also joined to them and retained on these end pieces. In order to form or apply the threads of composite structure, several winding aids are provided on an outer surface of the first and second end pieces respectively, distributed around the circumference, which protrude from the outer surface to enable the winding operation to be implemented. Accordingly, with the aid of a winding machine, the threads or thread bundles for forming the composite structure can be positioned both on the inner tube and extending between the first and second end pieces and then deflected already in the subsequent clamping region. The sole purpose of the winding aids is to enable the winding operation to be implemented. Once the thread structure has been formed and before the plastics material has solidified, they are reshaped and are thus moved into the threads of the composite structure and embedded therein.

Since the threads or thread bundles are already coated with an as yet non-solidified plastics material during the winding operation, the individual winding aids are still embedded in the non-solidified plastics material during the course of the reshaping operation. Due to the fact that the winding aids are now merely reshaped and no longer have to be removed, there is also no need for any subsequent process after the composite structure has formed by the solidification or curing of the plastics material. Another advantage resides in the fact that a virtually uninterrupted thread path can be achieved between the winding aids of the two end pieces because the threads merely have to be deflected in the region of the winding aids, thereby resulting in a compact and above all continuous thread structure within the composite structure or composite body. The winding aids are used solely to hold and deflect the threads during the winding operation and after that, once the plastics material has solidified or cured, are no longer needed for a load-supporting function.

Also of advantage is another embodiment because the fact that the end pieces are split respectively into a base part and a clamping part which can be displaced relative to it means that the winding aids can be disposed and retained on the base part. The relatively displaceable clamping part ensures that the winding aids are reshaped and following that ensures that the end of the composite structure is clamped. In this respect, the clamping part may either continue to serve as a remaining part of the end piece or alternatively may be removed once the composite structure of the shape-imparting body has been made and solidified and replaced by a separate component.

An embodiment is also of advantage because the two ends of the composite structure spaced apart from one another in the axial direction can be joined to the end pieces without requiring any additional work.

As a result of another embodiment, it is possible to create a positively acting support contour at the base part due to the differently selected inclinations, on which the internal face of the composite structure can be supported in a positive fit in order to transmit load in the axial direction.

Based on another embodiment, damage to the threads of the composite structure in the region of the clamping contour between the clamping part and base part can be prevented. At the same time, any expansion of the composite structure can also be prevented in the event of tensile strain in the axial direction.

Another embodiment is also of advantage because damage to the outer layers of the thread structure of the composite body or composite structure at the start of the clamping region is prevented.

The advantage of the design according to another embodiment is that due to the different size selected for the cross-section at the end of the composite structure, a circumferentially extending bead is created, which acts in the form of a clamping part if subjected to tensile strain which, due to the clamping region disposed upstream in the axial direction but having a smaller cross-section, cannot be moved without being broken. This results in a secure, positively fitting hold of the composite structure on both end pieces in the region of their housing chambers.

As a result of another embodiment, when the winding aids are reshaped and the housing chamber is then filled by still free-flowing plastics material, air inclusions and hence shrinkage are avoided. The housing chamber can therefore be completely filled by the plastics material and threads in order to form the composite structure.

Due to another embodiment, no additional aids are needed to obtain perfectly directed reshaping of the winding aids in the direction towards the longitudinal axis. However, this also prevents the deflected threads or thread bundles wound around the individual winding aids from inadvertently becoming detached during the winding operation.

Also of advantage is another embodiment because winding aids can be prefabricated independently of their fitting and, depending on the size and design of the cylinder housing to be produced, they can be mounted on the respective end pieces in a corresponding layout and number.

Based on an embodiment as, not every one of the winding aids has to be disposed on the respective end piece individually and instead they can be fitted on the respective end piece in conjunction with a connecting element as a unit.

Another embodiment has proved to be of advantage because a sharp edge at the outermost end region which could otherwise cause damage to the threads is avoided. Furthermore, the radial height of the individual winding aids projecting out from the outer surface of the end piece, in particular its base part, is also reduced, thereby avoiding edges which might disrupt the winding operation as well as too big a radial distance.

The objective is also independently achieved as a result of the features according to another aspect of the invention. The advantage gained by the combination of features of this aspect of the invention is that a unit can be created which has a reliable and long service life even at high pressures.

However, the objective is also independently achieved by means of a method for producing a cylinder housing for a pressure cylinder of lightweight hybrid construction having the features according to another aspect of the invention. The advantage obtained as a result of the combination of features specified in this aspect of the invention is that it is possible, first of all, to prepare an inner tube of an appropriate design which meets the requirements demanded of a cylinder chamber in terms of surface quality. End pieces are provided on its ends, which are used to guide the piston rod or to fit the pressure cylinder formed thereby. To provide a mutual connection of the end pieces, the composite structure made from a plastics material reinforced with threads is provided on the external face of the inner tube, extending continuously in the axial direction between the two end pieces and is also joined to them and retained on these end pieces. In order to form or apply the threads of composite structure, several winding aids are provided on an outer surface of the first and second end pieces respectively, distributed around the circumference, which protrude from the outer surface to enable the winding operation to be implemented. Accordingly, with the aid of a winding machine, the threads or thread bundles for forming the composite structure can be positioned both on the inner tube and extending between the first and second end pieces and then deflected already in the subsequent clamping region. The sole purpose of the winding aids is to enable the winding operation to be implemented. Once the thread structure has been formed and before the plastics material has solidified, they are reshaped and are thus moved into the threads of the composite structure and embedded therein.

Since the threads or thread bundles are already coated with an as yet non-solidified plastics material during the winding operation, the individual winding aids are still embedded in the non-solidified plastics material during the course of the reshaping operation. Due to the fact that the winding aids are now merely reshaped and no longer have to be removed, there is also no need for any subsequent process after the composite structure has formed by the solidification or curing of the plastics materials. Another advantage resides in the fact that a virtually uninterrupted thread path can be achieved between the winding aids of the two end pieces because the threads merely have to be deflected in the region of the winding aids, thereby resulting in a compact and above all continuous thread structure within the composite structure or composite body. The winding aids are used solely to hold and deflect the threads during the winding operation and after that, once the plastics material has solidified or cured, are no longer needed for a load-supporting function.

The selected method steps according to another embodiment are of advantage because the fact that the end pieces are split respectively into a base part and a clamping part which can be displaced relative to it means that the winding aids can be disposed and retained on the base part. The relatively displaceable clamping part ensures that the winding aids are reshaped and following that ensures that the end of the composite structure is clamped. In this respect, the clamping part may either continue to serve as a remaining part of the end piece or alternatively may be removed once the composite structure of the shape-imparting body has been made and solidified and replaced by a separate component.

An approach based on the features according to another embodiment is of advantage because from completion of the winding operation to the point of fitting the clamping part on the base part, no additional work steps are needed to obtain the final three-dimensional shape of the composite structure and retain it on the end pieces.

In another advantageous approach the thread structure is tautened even before the plastics material has solidified and the threads are embedded. This enables better cohesion to be obtained for a shorter longitudinal extension between the two end pieces spaced apart from one another in the axial direction.

A variant of the method is also of advantage because the two ends of the composite structure spaced apart from one another in the axial direction can be joined to the respective end piece without the need for any additional processing.

Finally, however, an approach based on the features according to another embodiment is also of advantage because it is not until the thread structure has been formed and the clamped position between the base part and clamping part has been obtained that the final curing of the plastics material takes place. As a result, complete filling can be achieved in the clamping region as well as in the housing chamber, thereby resulting in a voluminous, solid design of the end of the composite structure after curing.

To provide a clearer understanding, the invention will be described in more detail below with reference to the appended drawings.

Figure 2:
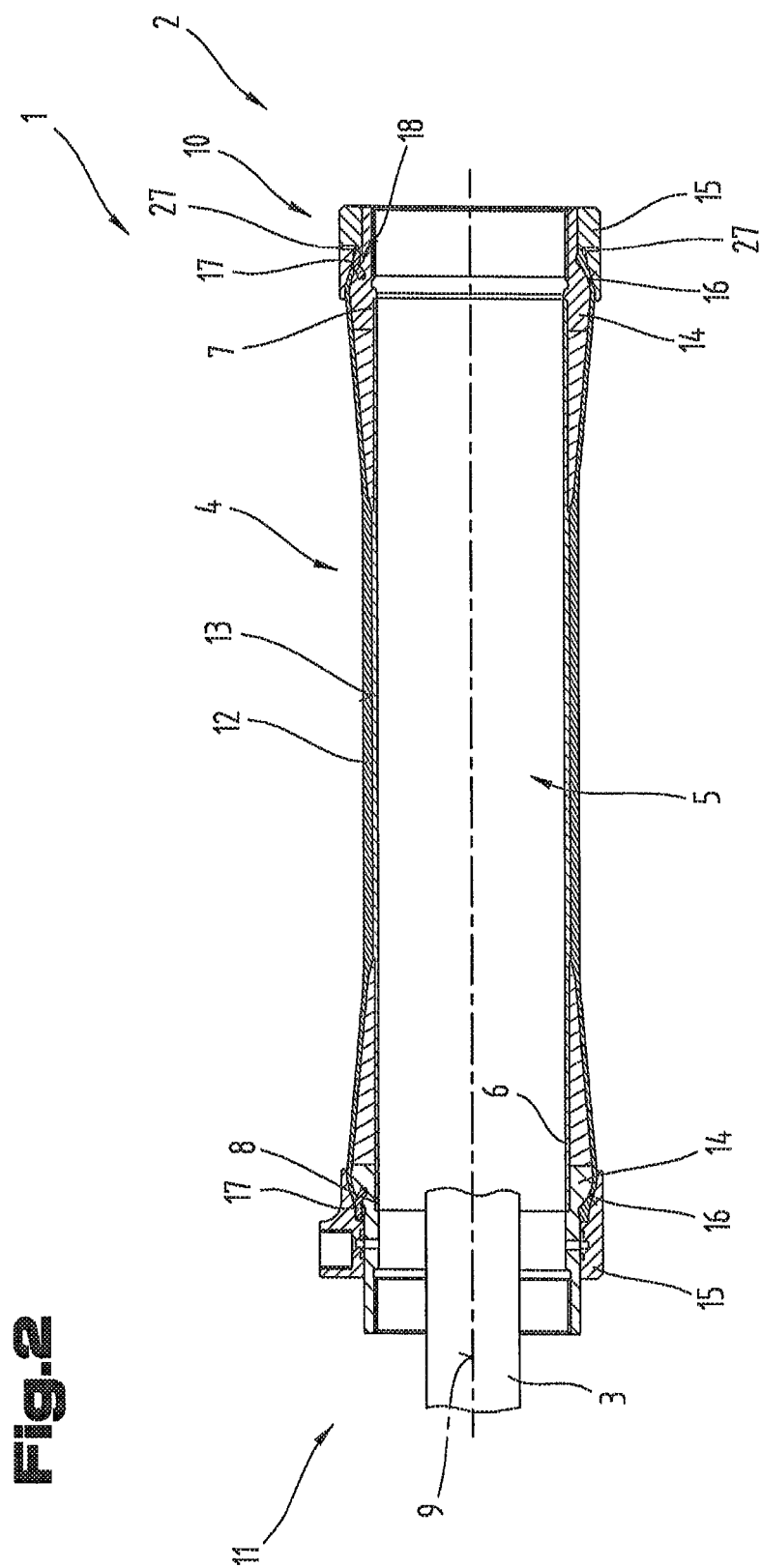
Figure 5:
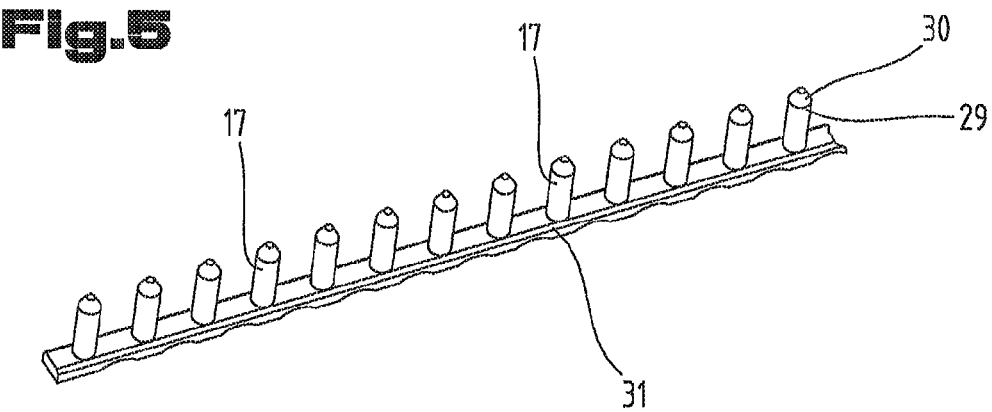
Figure 6:
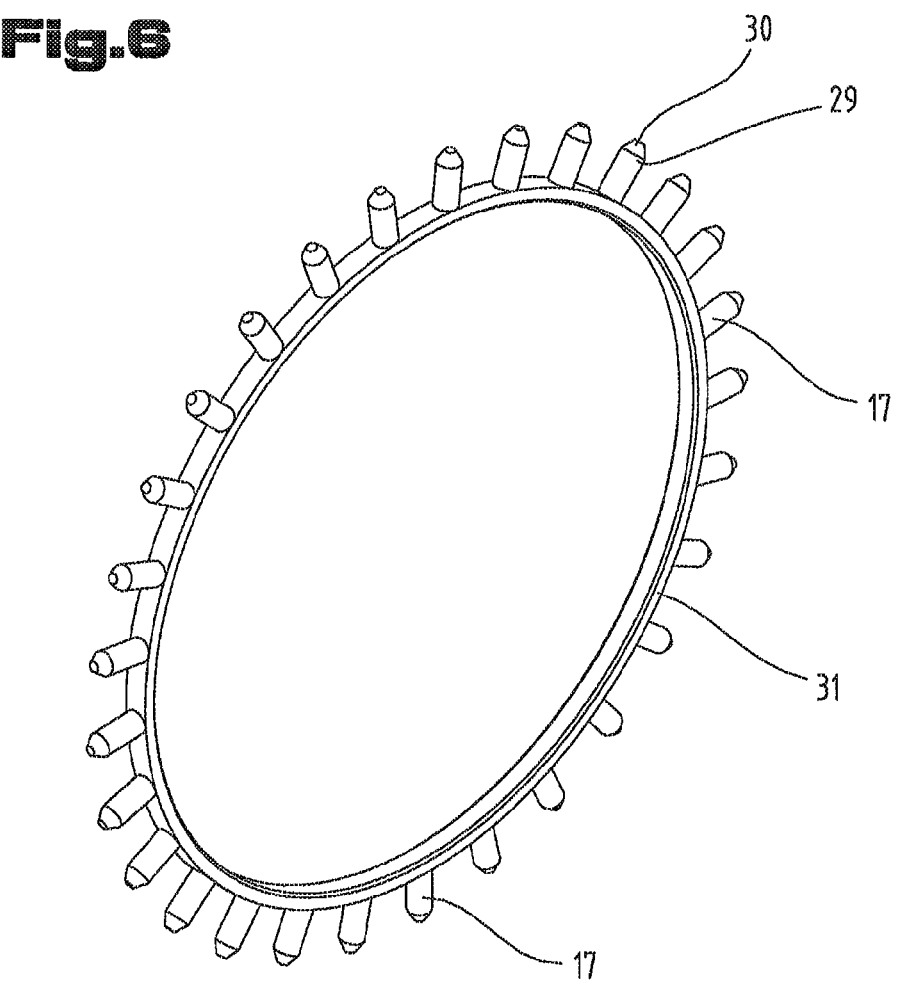

These are highly schematic, simplified diagrams in each case, illustrating the following:

FIG. 1 a simplified diagram of a pressure cylinder;

FIG. 2 an axial section through the cylinder housing of the pressure cylinder but with the piston removed and the piston rod only partly indicated;

FIG. 3 one end of the cylinder housing after applying the threads of the composite structure but before the end piece has reached the position in which the composite structure is clamped, shown in axial section and on a diagrammatically enlarged scale;

FIG. 4 a part region of the end illustrated in FIG. 3 after applying the threads of the composite structure to form the support structure but with the winding aids already reshaped by the clamping part, shown in axial section and on a diagrammatically enlarged scale;

FIG. 5 another possible option for holding the winding aids on a connecting element supporting them, shown in a simplified diagram;

FIG. 6 another possible option for holding the winding aids on an annular connecting element supporting them, shown in a simplified diagram.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 is a simplified diagram illustrating a working cylinder in the form of a pressure cylinder 1, comprising a cylinder housing 2 of lightweight hybrid construction and a piston with a piston rod 3 connected to it, although the latter is not illustrated in detail. The pressure cylinder may be a hydraulic cylinder, pneumatic cylinder or hydro-pneumatic cylinder, for example. The pressure cylinder may also be a double-acting cylinder, differential cylinder, synchronized cylinder, tandem cylinder, a single-acting cylinder, plunger cylinder or telescopic cylinder.

One aspect of this invention is the cylinder housing 2 itself. Another aspect of the invention may be the pressure cylinder 1 with such a cylinder housing 2 as well as the piston and piston rod disposed in it. However, another aspect of the invention may also be the method for producing the cylinder housing 2.

FIGS. 2 to 4 are diagrams illustrating different views and sections of the cylinder housing 2 for forming the pressure cylinder 1 to enable a better description of its structure to be given.

The cylinder housing 2 comprises or is made up of a number of different components, the intention being to obtain a so-called lightweight hybrid construction. Particularly with respect to the cylinder tube, the aim is to obtain a considerable saving on weight whilst nevertheless proposing a cylinder housing 2 of the type that is also capable of operation at relatively high working pressures and which can be scaled to a large design construction.

Accordingly, the cylinder housing 2 comprises a support structure 4 having a cylinder chamber 5 for accommodating the piston, not illustrated, and a part of the piston rod 3.

The support structure 4 comprises an inner tube 6 having ends 7, 8 spaced apart from one another in the axial direction. This is usually a metal tube which, on its surface facing the cylinder chamber 5, is of an appropriate surface quality for fulfilling a guiding and sealing function. A longitudinal axis 9 extends between the two ends 7, 8 spaced apart from one another in the axial direction, which defines a center of the inner tube 6 and support structure 4. As also illustrated, a first end piece 10 is provided in the region of the first end 7 of the inner tube 6 and a second end piece 11 is provided in the region of the second end 8.

The support structure 4 further comprises a composite structure 12 made from a plastics material reinforced with threads, although the latter are not illustrated. For the sake of simplicity, the composite structure 12 is illustrated as a single component but is made up of differently disposed and differently extending threads and thread layers which, once the threads have been applied or wound, will then be solidified to obtain a component held together by the plastics material. The composite structure 12 may also comprise several layers of threads or thread bundles disposed and oriented in different ways from one another. Individual ones of the layers may be disposed at an angular orientation of ca. 90° with respect to the longitudinal axis 9. These continuously extending threads form a layer capable of providing a high resistance to a radial pressure from inside and capable of absorbing such forces. This affords a support for the inner tube 6 at its outer surface 13. This layer is usually also the first or innermost layer of the der composite structure 12.

To enable the two end pieces 10, 11 to be held positioned relative to one another at a specific distance in the axial direction, other thread layers may be provided forming a sort of longitudinal winding. Accordingly, the individual threads or thread bundles used to form the longitudinal winding may be provided or disposed within an angular range of between 0° and 30°, in particular between 0° and 10°, relative to the longitudinal axis 9, extending at an angle to it on the side of the inner tube 6 facing away from the cylinder chamber 5. In order to obtain additional radial hold or cohesion of the threads or thread bundles forming the longitudinal winding, the uppermost layer may likewise have another winding orientation whereby the individual threads can be disposed at approximately 90° with respect to the longitudinal axis 9, both adjacent to one another and one above the other. In this respect, at least the threads or thread bundles of the lengthways layer are oriented so that they extend continuously between the first and second end pieces 10, 11 and are respectively joined to the latter to enable a predefined distance to be set between the two end pieces 10, 11 as a function of the inner tube 6.

In this respect, it should be pointed out that the lengthways layers and longitudinal windings described above as well as the transverse windings extending at an angle of ca. 90° with respect to the longitudinal axis 9 may also be disposed or applied several times in an alternating sequence. The uppermost or outermost layer is preferably a circumferential winding layer which subtends an angle of ca. 90° with the longitudinal axis 9.

The structure and disposition of the connection of the composite structure 12 to the first and second end pieces 10, 11 is identical but for the sake of greater clarity, only the base end of the cylinder housing 2 with its first end piece 10 will be described and explained in detail.

FIGS. 3 and 4 are diagrams illustrating an axial section in the region of the first end 7 of the inner tube 6 with the first end piece 10 retained on it. The explanations given here with reference to the first end piece 10 equally apply to the second end piece 11, in which case the orientations and dispositions of the components relative to one another respectively will be in the opposite orientation with respect to the axial direction of the cylinder housing 2.

Since such pressure cylinders 1 are subjected not only to a high radial pressure transmitted from the cylinder chamber 5 through to the inner tube 6 and then into the support structure 4 during operation but also to an axial force between the two end pieces 10, 11, the support structure 4, in particular the composite structure 12, is crucial. This being the case, the hold of the composite structure 12 and hence the connection between the first and second end piece 10, 11 is of particular importance. The composite structure 12 should therefore be such that it extends continuously in the axial direction between the first and second end pieces 10, 11.

In the embodiment illustrated as an example here, both the first end piece 10 and the second end piece 11 respectively comprises a base part 14 and a clamping part 15 which is displaceable relative to it. By relatively displaceable is meant a displacement in the axial direction. Furthermore, if using a thread arrangement between the base part 14 and clamping part 15, although this is not illustrated, there will also be a displacement in rotation about the longitudinal axis 9 in order to impart the axial displacement between these two parts 14, 15, resulting in a positive movement. The composite structure 12 is usually held stationary on the end pieces 10, 11 and the clamping part 15 is displaced relative thereto. The base part 14 lies closer to the longitudinal axis 9 and is thus disposed inside the outwardly lying clamping part 15, and the clamping part overlaps at least certain regions of the base part 14 on the outside.

In the winding methods used to date, the usual approach has been to apply the threads or thread bundles forming the composite structure 12 so that they extend in the axial direction respectively towards the mutually remote side across the end pieces 10, 11 to enable the individual threads or thread bundles to be deflected on externally disposed pins. This was how the lengthways layers or longitudinal windings were formed. Once the plastics material had cured and the threads embedded in the plastics material as a result, the protruding part of the previously produced composite structure was cut off at a predefined point, leading to an all-round continuous interruption and hence severing of the individual threads in the severance cross-section.

The design of the first end piece 10 illustrated here is such that several winding aids 17 are provided, distributed respectively around the circumference on its outer surface 16, in particular on its base part 14. Accordingly, the winding aids 17 protrude from the outer surface 16 of the end piece 10, in particular the base part 14. In the embodiment illustrated as an example here, the individual winding aids 17 are rod-shaped or pin-shaped and are used during the process of applying the threads of the composite structure 12 to enable the requisite winding operation to be implemented. To this end, the strength of the winding aids 17 is such that the winding operation can proceed in a known manner. During winding, individual threads of the composite structure 12 are fed in the axial direction respectively towards mutually remote sides in a deflection region 18 and wrapped around one of the winding aids 17 and the threads or thread bundles are thus held stationary on the base part 14 of the first end piece 10 with the plastics material still in the non-solidified state. The winding aids 17 could also be described as pins. During the phase of winding the threads or thread bundles, the winding aids 17 extend out or protrude from the composite structure 12 to be produced. As a result, threads or thread bundles are securely held on the base part 14 until the operation of reshaping the individual winding aids 17 by means of the clamping part 15, still to be described.

As will be described below, the winding aids 17 must be deformable, have no sharp edges and must not have too high a brittleness as this would cause them to break off during reshaping. The winding aids 17 are usually made from a plastics material with corresponding properties and are used exclusively to hold the threads in position on the base part 14 during the winding operation but not to make any significant contribution to the transmission of force by the composite structure 12 through to the two end pieces 10, 11. Due to the fact that the longitudinal extension of the threads of the composite structure 12 between the two base parts 14 of the end pieces 10, 11 is usually disposed at an angle with respect to the longitudinal axis 9, the thread or thread bundle in the outer deflection region 18 is fed and deflected round one of the winding aids, and is then fed on in the circumferential direction and in turn fed round another of the winding aids 17 in another deflection region 18 so that the thread is fed at the predefined angle of inclination with respect to the longitudinal axis 9 as described above to another winding aid 17 of the second end piece 11 or base part 14 thereof, where it is deflected again accordingly.

As may be seen more clearly from FIG. 4, the clamping part 15 is disposed in a so-called clamped position relative to the base part 14. This relative positioning of the clamping part 15 with respect to the base part 14 takes place once the still non-solidified composite structure 12 and its threads have been fully formed. The plastics material used to form the composite structure 12 may be applied during the course of the winding operation by using already coated threads or thread bundles, for example, or alternatively by applying a coating subsequently and/or by dipping the threads. However, it is preferable to use a thread or thread bundle that is coated or impregnated with as yet non-solidified plastics material to ensure that a corresponding quantity of plastics material is also provided in the immediate vicinity of the inner tube 6 and base parts 14 of the end pieces 10, 11 to embed the threads and form the composite structure 12. When the clamping part 15 is axially displaced relative to the base part 14 after forming the composite structure 12, the winding aids 17 are reshaped and embedded in the composite structure 12 in at least certain regions.

As illustrated in FIG. 4, the clamping part 15 is illustrated at the point when it has assumed the clamped position with the base part 14 and a circumferentially extending housing chamber 19 is formed between the base part 14 and clamping part 15 in which the end of the composite structure 12 and the reshaped winding aids 17 are accommodated. The base part 14 is pushed onto the end 7 of the inner tube 6 to form a shoulder, and in this instance no fixed connection is provided between the base part 14 and the end 7 of the inner tube 6 (sliding fit).

As viewed in axial section, the base part 14 has an upwardly extending inclination 20 on the side remote from the inner tube 6, which may also be disposed at a distance apart from the outer surface 13 of the inner tube 6 in the radial direction. On the side of the inclination 20 remote from the cylinder chamber 5, it is adjoined by a transition section 21, disposed or provided at a maximum radial distance from the longitudinal axis 9. Adjoining this transition section 21 is a curved, downwardly extending supporting curve 22 and the winding aids 17 described above may also be disposed or retained in the end region of the supporting curve 22. The inclination 20, transition section 21 and adjoining supporting curve 22 also form a supporting contour 23 for the internal face of the composite structure 12 extending around the circumference.

The clamping part 15 is used as a means of fixing and securely clamping the composite structure 12 to enable axial forces to be transmitted between the two end pieces 10, 11. To this end, at least in a region lying opposite the transition section 21 and a part-section of the supporting curve 22 adjoining it, the clamping part 15 has, parallel therewith, a clamping contour 24 extending in an offset arrangement on the side facing away from the longitudinal axis 9. The dimension of the radial offset approximately corresponds to a thickness of the layers of threads of the composite structure 12 in this region. To prevent the threads from being pushed in or squashed in the region of the composite structure 12 merging into the clamping part 15, the clamping part 15 may have at the start of its clamping contour 24 lying opposite the transition section 21, as viewed in axial section, a lead-in widening 25. Accordingly, there is a widening in the cross-section between the supporting contour 23 and clamping contour 24.

The cross-section of the housing chamber 19, as viewed in axial section, is also, in the region of the transition section 21 and the adjoining part-section of the supporting curve 22, of a smaller size than the cross-section of the deflection region 18, spaced apart from it in the axial direction, where the threads of the composite structure 12 are deflected round the winding aids 17. This forms a housing chamber 26 between the base part 14 and clamping part 15 in the deflection region 18 where the threads of the composite structure 12 are deflected round the winding aids 17. The housing chamber 26 may also communicate with the external environment via at least one passage 27 disposed in the clamping part 15. The purpose of the passage or passages 27 is to allow surplus, free-flowing plastics material to flow out of the housing chamber 26 during the relative axial displacement or movement of the clamping part 15 into the clamped position with the base part 14. However, this also allows any air which might be enclosed in the housing chamber 26 to escape in order to obtain a composite structure 12 of threads and plastics material without shrinkage.

To ensure that the operation of winding the threads is performed correctly on the one hand and the latter are wound correctly round the winding aids 17 on the other, the winding aids 17 are disposed so that they extend at an angle with respect to the longitudinal axis 9. This inclined oblique position of the winding aids 17 is also used to enable the above-mentioned operation of reshaping the portion of the Winding aids 17 protruding beyond the outer surface 13. It has proved to be of practical advantage if the angle of inclination with respect to the longitudinal axis 9 is between 30° and 45°. Furthermore, the direction of the inclination is selected so that it is directed in an upwardly extending arrangement towards the mutually remote side of the winding aids 17.

The winding aids 17 may be retained on the end pieces 10, 11, in particular their base parts 14, in various ways. In the embodiment illustrated as an example here, each of the individual winding aids 17 can be separately inserted in an orifice 28 in the respective base part 14 of the end piece 10, 11 provided for this purpose and are preferably held fixed therein.

Furthermore, each of the winding aids 17 may have a bevel with a bevel surface 30 disposed on its end region 29 facing away from the base part 14 of the end piece 10, 11. The bevel surface 30 is preferably continuous all round. As viewed in axial section, the bevel surface 30 may also extend on its side facing away from the longitudinal axis 9 approximately parallel with the inclination 20 on the base part 14. The reason for this is that there is then no sharp edge projecting towards the side of the winding aid 17 remote from the longitudinal axis 9 which might prove disruptive during a winding operation.

As described above, the outermost or top layer of the threads of the composite structure, which are applied as a circumferential winding, are applied or disposed across all the lengthways layers as far as just before the winding aids 17 in the region of the two end pieces 10, 11. This prevents any radial give in the threads or thread bundles forming the lengthways layers.

When producing the cylinder housing 2 for the pressure cylinder 1, a method may be used whereby the support structure 4 comprising the inner tube 6 with the ends 7, 8 spaced apart from one another in the axial direction, the first and second end pieces 10, 11 as well as the composite structure 12 are formed. To this end, the first and second end piece 10, 11 are disposed on the inner tube 6 respectively in the region of one of the ends 7, 8. The composite structure 12 is then formed by means of a plastics material reinforced with threads or thread bundles, which is applied to the outer surface 13 of the inner tube 6. The composite structure 12 is therefore applied so that it extends continuously in the axial direction between the first and second end pieces 10, 11 and is also joined to the first and second end pieces 10, 11.

Furthermore, several winding aids 17 protruding from the outer surface 16 are provided on the outer surface 16 of the first and second end pieces 10, 11, distributed around their circumference. As the threads of the composite structure 12 are being applied during the course of the winding operation, the threads described above for forming the lengthways layers are applied as well as the threads for forming the circumferential or transverse layers on the support structure 4 with the inner tube 6 and the first and second end piece 10, 11. In the deflection region 18, the threads or thread bundles are respectively fed so that they extend round one of the winding aids 17, if necessary round several winding aids 17, in the circumferential direction, and then round another winding aid 17 spaced at a distance apart from it and back down respectively to the other end piece 10, 11. Due to the fact that the end piece 10, 11 is made up of the base part 14 and the clamping part 15 which can be displaced relative to it, the winding aids 17 are preferably provided on the base part 14 of the end piece 10, 11. However, it would also be possible for the thread or threads to be wound round one of the winding aids 17 about an angle of ca. 180° and then fed directly at the predefined longitudinal winding angle with respect to the longitudinal axis 9 to a winding aid 17 disposed on the other end piece 11,10.

Once the threads for forming the composite structure 12 have been wound and applied, the clamping part 15 is screwed to the base part 14, for example by a screwing operation by means of a co-operating thread arrangement. Due to this axial relative displacement with respect to one another, the winding aids 17 protruding beyond the threads of the composite structure 12 are firstly reshaped and, due to their already inclined orientation with respect to the longitudinal axis 9, are specifically reshaped in the direction towards the longitudinal axis 9. As this happens, the individual winding aids 17 are pushed into and/or embedded in the threads and the as yet non-solidified plastics material of the composite structure 12.

If the clamping part 15 is displaced even further in the axial direction relative to the base part 14, the so-called clamped position between the base part 14 and clamping part 15 is reached. On reaching this clamped position, a gap is formed between the supporting contour 23 of the base part 14 and the clamping contour 24 of the clamping part 15 and, as viewed in axial section, the radial distance approximately corresponds to the thickness of the layers of threads of the composite structure 12.

By providing the housing chamber 26 with a larger cross-section in the deflection region 18 where the threads of the composite structure 12 are wound round the winding aids 17, the reshaped end regions 29 of the individual winding aids 17 can be accommodated in this housing chamber 26. Also as a result of the housing chamber 26 with a larger cross-section, a sort of clamping wedge or clamping bead is formed at the end of the composite structure 12. Once the plastics material has cured and solidified with the threads or thread bundles embedded therein, the end region of the composite structure 12 in the deflection region 18 can no longer be pulled out of the housing chamber 26, being of a thicker design, because the adjoining clamping passage between the supporting contour 23 and the clamping contour 24 is of a smaller cross-sectional dimension. This provides a mechanical fixing or retaining means for the two end regions of the composite structure 12 on the first and second end piece 10, 11. This being the case, even strong axial forces can be transmitted between the two end pieces 10, 11 via the composite structure 12, thereby resulting in a very stable hold in the axial direction.

By reshaping the winding aids 17 respectively in their end regions 29 protruding beyond the base part 14 in the direction towards the longitudinal axis 9, the threads of the composite structure 12 wound round the winding aids 17 in the deflection region 18 are additionally tautened in the axial direction. In this tautened position, the winding aids 17 reshaped in this manner are embedded in the composite structure 12 and accommodated in the housing chamber 26.

In addition however, a protective element in the form of a sleeve or sheath may be provided on the external face of the support structure 4, in particular the composite structure 12, in order to ensure that the threads embedded in the plastics material and hence the composite structure 12 are protected. This protective sheath may be made from various materials, e.g. plastics material, metal, composite components, etc. This protective element may extend continuously in the axial direction between the two end pieces 10, 11 and may optionally be retained on them and/or on the composite structure 12.

FIG. 5 illustrates an embodiment of the winding aids 17 and the way that they are retained, which may be construed as an independent embodiment in its own right. The same reference numbers and component names are used to denote parts that are the same as those described with reference to FIGS. 1 to 4 above. To avoid unnecessary repetition, reference may be made to the detailed descriptions of FIGS. 1 to 4 given above.

As already described, the individual winding aids 17 are disposed around the circumference in a distributed arrangement on the end pieces 10, 11, in particular their base part 14. In the case of the embodiment described above with reference to FIGS. 2 to 4, the individual winding aids 17 are accommodated in separate orifices 28 in the end piece 10, 11, in particular the base part 14 thereof.

By contrast with this, the winding aids 17 of this embodiment are disposed one after the other in a row on a continuously extending connecting element 31 and protrude from the latter. The connecting element 31 may either be manufactured to the appropriate circumferential length or cut from an endless roll. The connecting element 31 may be inserted in an annular receiving groove, not illustrated, of the end piece 10, 11, in particular in its base part 14, and retained there. An additional means for clamping or retaining the connecting element 31 on the end piece 10, 11 or its base part 14 may also be provided.

FIG. 6 illustrates another embodiment of the winding aids 17 and the way they are retained, which may likewise be construed as an independent embodiment in its own right. The same reference numbers and component names are used to denote parts that are the same as those described with reference to FIGS. 1 to 5 above. To avoid unnecessary repetition, reference may be made to the detailed descriptions of FIGS. 1 to 5 given above.

By contrast with the embodiment described with reference to FIG. 5 above, the connecting element 31 in this instance is of an annular design, and the connecting elements 31 are therefore manufactured in the requisite continuous circumferential length depending on the diameter or size of the cylinder housing 2 to be produced. Another option in terms of fitting would be to use a prefabricated connecting element 31 of an annular shape already but then cut it in its circumferential region to make fitting of the connecting element 31 with the winding aids 17 protruding from the end piece 10, 11, in particular its base part 14, easier.

For the sake of good order, finally, it should be pointed out that, in order to provide a clearer understanding of the structure of the cylinder housing 2 and pressure cylinder 1, they and their constituent parts are illustrated to a certain extent out of scale and/or on an enlarged scale and/or on a reduced scale.

The objective underlying the independent inventive solutions may be found in the description.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

The embodiments illustrated as examples represent possible variants of the cylinder housing 2 and pressure cylinder 1, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention. Furthermore, individual features or combinations of features from the various examples of embodiments illustrated and described may be construed as independent solutions proposed by the invention.

Above all, the individual embodiments of the subject matter illustrated in FIGS. 1; 2, 3, 4; 5; 6 constitute independent solutions proposed by the invention in their own right. The objectives and associated solutions proposed by the invention may be found in the detailed descriptions of these drawings.

List of reference numbers

| | |
|---|---|
| 1 | Pressure cylinder |
| 2 | Cylinder housing |
| 3 | Piston rod |
| 4 | Support structure |
| 5 | Cylinder chamber |
| 6 | Inner tube |
| 7 | End |
| 8 | End |
| 9 | Longitudinal axis |
| 10 | First end piece |
| 11 | Second end piece |
| 12 | Composite structure |
| 13 | Outer surface |
| 14 | Base part |
| 15 | Clamping part |
| 16 | Outer surface |
| 17 | Winding aid |
| 18 | Deflection region |
| 19 | Housing chamber |
| 20 | Inclination |
| 21 | Transition section |
| 22 | Supporting curve |
| 23 | Supporting contour |
| 24 | Clamping contour |
| 25 | Lead-in widening |
| 26 | Housing chamber |
| 27 | Passage |
| 28 | Orifice |

-continued

List of reference numbers

| | |
|---|---|
| 29 | End region |
| 30 | Bevel surface |
| 31 | Connecting element |

The invention claimed is:

1. Cylinder housing (2) for a pressure cylinder (1), in particular for a hydraulic cylinder, pneumatic cylinder or hydro-pneumatic cylinder, of lightweight hybrid construction comprising
a support structure (4) comprising
an inner tube (6) with ends (7, 8) that are spaced apart from one another in the axial direction and a longitudinal axis (9) extending between them,
and a first and a second end piece (10, 11) disposed respectively in the region of one of the ends (7, 8) of the inner tube (6),
and having a composite structure (12) made from a fiber-reinforced plastics material, which composite structure (12) is disposed on an outer surface (13) of the inner tube (6) extending continuously in the axial direction between the first and second end piece (10, 11) and joined to the latter, and
several rod-shaped winding aids (17) are disposed on an outer surface (16) of the first and second end pieces (10, 11) distributed respectively around the circumference thereof and protruding from the outer surface (16), the winding aids (17) having sufficient strength to allow a winding operation as the threads of the composite structure (12) are applied, whereby individual threads of the composite structure (12) are guided around at least one of the winding aids (17) in a deflection region (18) on sides respectively facing away from one another in the axial direction,
wherein
following the formation of the composite structure (12), the winding aids (17) are reshaped and at least regionally embedded in the composite structure (12).

2. Cylinder housing (2) according to claim 1, wherein the end piece (10, 11) comprises a base part (14) and a clamping part (15) that is displaceable relative to it and the winding aids (17) are disposed on the base part (14) of the end piece (10, 11).

3. Cylinder housing (2) according to claim 2, wherein a circumferentially extending housing chamber (19) is formed in a clamped position between the base part (14) and the clamping part (15), in which the composite structure (12) and the reshaped winding aids (17) are accommodated.

4. Cylinder housing (2) according to claim 2, wherein as viewed in axial section, the base part (14) has an inclination (20) extending upwards towards the side remote from the inner tube (6), which extends in the radial direction at a distance from the outer surface (13) of the inner tube (6) and, in a transition section (21) at a maximum radial distance from the longitudinal axis (9), merges into a supporting curve (22) extending in a downwardly curved arrangement, and the inclination (20), transition section (21) and supporting curve (22) form a supporting contour (23) extending around the circumference.

5. Cylinder housing (2) according to claim 4, wherein as viewed in axial section, the clamping part (15) has, at least in a region lying opposite the transition section (21) and a part-portion of the supporting curve (22) adjoining it, a clamping contour (24) parallel therewith extending in an offset arrangement towards the side remote from the longitudinal axis (9), and the dimension of the radial offset approximately corresponds to a thickness of the layers of threads of the composite structure (12).

6. Cylinder housing (2) according to claim 5, wherein as viewed in axial section, the clamping part (15) has a lead-in widening (25) at the start of its clamping contour (24) lying opposite the transition section (21).

7. Cylinder housing (2) according to claim 4, wherein as viewed in axial section, the cross-section of a clamping passage formed between the supporting contour (23) in the region of its transition section (21) and the part-portion of the supporting curve (22) adjoining it as well as the clamping contour (24) offset therefrom in the radial direction is smaller than the cross-section in the deflection region (18) spaced apart therefrom in the axial direction where the threads of the composite structure (12) are wound around the winding aids (17).

8. Cylinder housing (2) according to claim 2, wherein in the deflection region (18) where the threads of the composite structure (12) are wound around the winding aids (17) a housing chamber (26) is formed by the base part (14) and clamping part (15), and the housing chamber (26) communicates with the external environment via at least one passage (27) disposed in the clamping part (15).

9. Cylinder housing (2) according to claim 1, wherein the winding aids (17) are disposed at an angle with respect to the longitudinal axis (9) and the winding aids (17) of the first and those of the second end pieces (10, 11) extend in an upwardly inclined arrangement respectively towards the sides facing away from one another.

10. Cylinder housing (2) according to claim 1, wherein each of the winding aids (17) is inserted individually in an orifice (28) provided in the respective end piece (10, 11), in particular in its base part (14), and is retained therein.

11. Cylinder housing (2) according to claim 1, wherein several of the winding aids (17) are disposed on a continuous connecting element (31) distributed across its longitudinal extension, and the connecting element (31) is inserted in an annular receiving groove of the end piece (10, 11), in particular its base part (14), and is retained therein.

12. Cylinder housing (2) according to claim 1, wherein the winding aid (17) has a bevel with a bevel surface (30) on its end region (29) facing away from the end piece (10, 11), in particular from its base part (14), and as viewed in axial section, on its side facing away from the longitudinal axis (9) the bevel surface (30) extends approximately parallel with the inclination (20) disposed on the base part (14) of the end piece (10, 11) before the winding aids (17) are reshaped.

13. Pressure cylinder (1) comprising a cylinder housing (2) of lightweight hybrid construction, a piston disposed in the cylinder housing (2) and a piston rod (3) connected to the piston, wherein the cylinder housing (2) is based on a design according to claim 1.

14. Method of producing a cylinder housing (2) for a pressure cylinder (1), in particular for a hydraulic cylinder, pneumatic cylinder or hydro-pneumatic cylinder, of lightweight hybrid construction whereby a support structure (4) is formed comprising an inner tube (6) with ends (7, 8) spaced apart from one another in the axial direction, a first and a second end piece (10, 11), and a composite structure (12), the first and second end piece (10, 11) being disposed respectively in the region of one of the ends (7, 8) of the inner tube (6) and the composite structure (12) is made from a fiber-reinforced plastics material which is applied to an outer surface (13) of the inner tube (6), and the composite structure (12) extends continuously in the axial direction between the first and second end piece (10, 11) and is joined to the first and second end piece (10, 11), and several winding aids (17) are provided on an outer surface (16) of the first and second end pieces (10, 11) distributed respectively around the circumference thereof protruding from the outer surface (16), and the winding aids (17) are of a rod-shaped design, and the winding aids (17) are designed to have a sufficient strength to allow the threads of the composite structure (12) to be applied by means of a winding operation whereby individual threads are fed towards sides respectively facing away from one another in the axial direction in a deflection region (18) where they are wound around at least one of the winding aids (17), wherein after applying the composite structure (12), the winding aids (17) are at least regionally embedded in the composite structure (12) by reshaping.

15. Method according to claim 14, wherein the end piece (10, 11) comprises a base part (14) and a clamping part (15) that is displaceable relative to it and the winding aids (17) are disposed on the base part (14) of the end piece (10, 11).

16. Method according to claim 15, wherein the composite structure (12) and the winding aids (17) reshaped by the axial displacement are accommodated in the housing chamber (19) formed between the base part (14) and the clamping part (15).

17. Method according to claim 15, wherein after reshaping the winding aids (17) and when the clamped position between the base part (14) and clamping part (15) is reached, the plastics material surrounding the threads is solidified.

18. Method according to claim 14, wherein after applying the threads of the composite structure (12), the clamping part (15) is displaced relative to the base part (14) in the axial direction until a clamped position is obtained between the base part (14) and the clamping part (15) in which a circumferentially extending housing chamber (19) is formed between the base part (14) and clamping part (15), and the winding aids (17) are reshaped by the clamping part (15) during the axial displacement of the clamping part (15).

19. Method according to claim 14, wherein the winding aids (17) are reshaped respectively by their end regions (29) protruding from the end piece (10, 11), in particular the base part (14) thereof, in the direction towards the longitudinal axis (9) and the threads of the composite structure (12) wound around the winding aids (17) in the deflection region (18) are thus tautened in the axial direction.

\* \* \* \* \*